United States Patent Office 3,518,939
Patented July 7, 1970

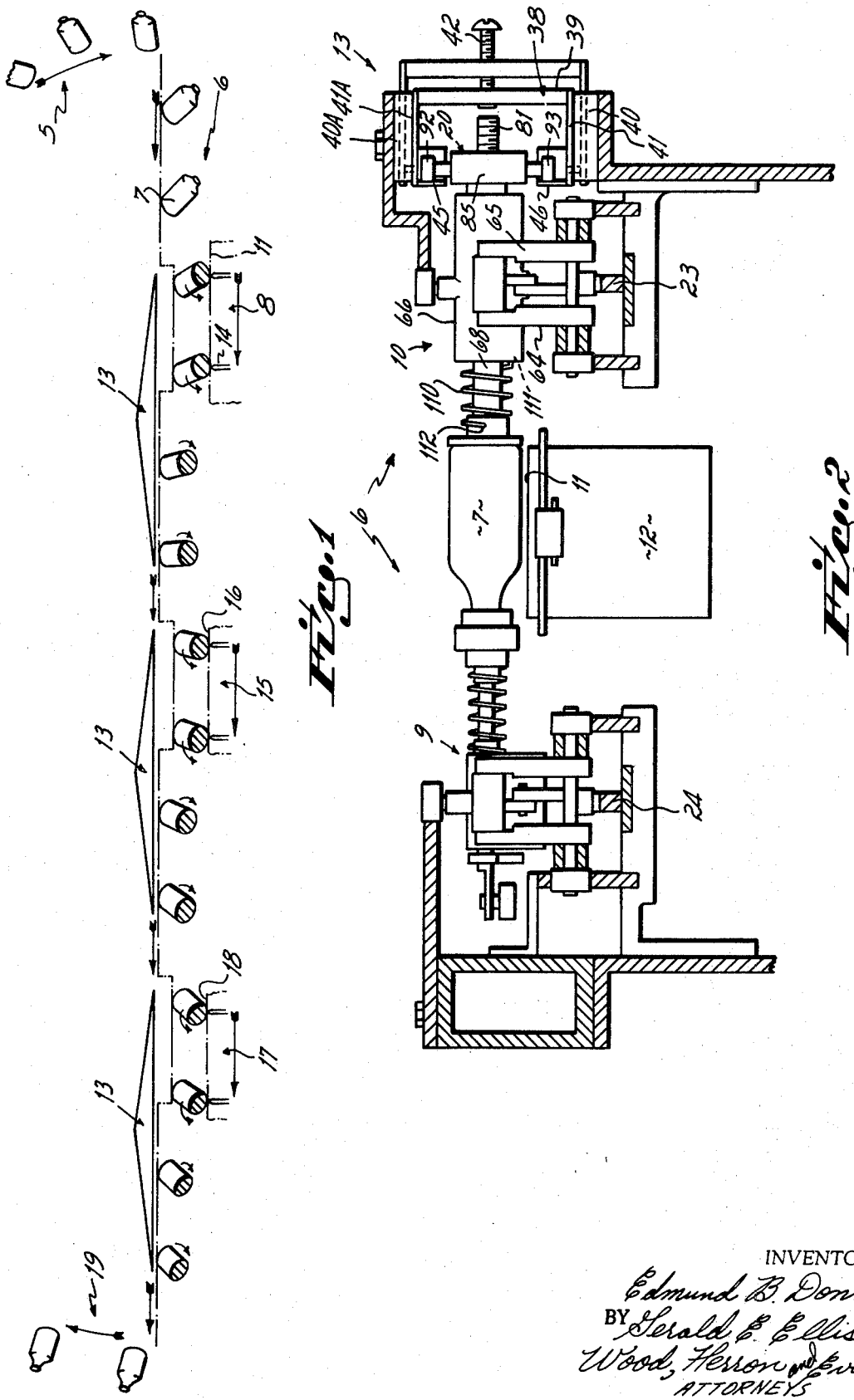

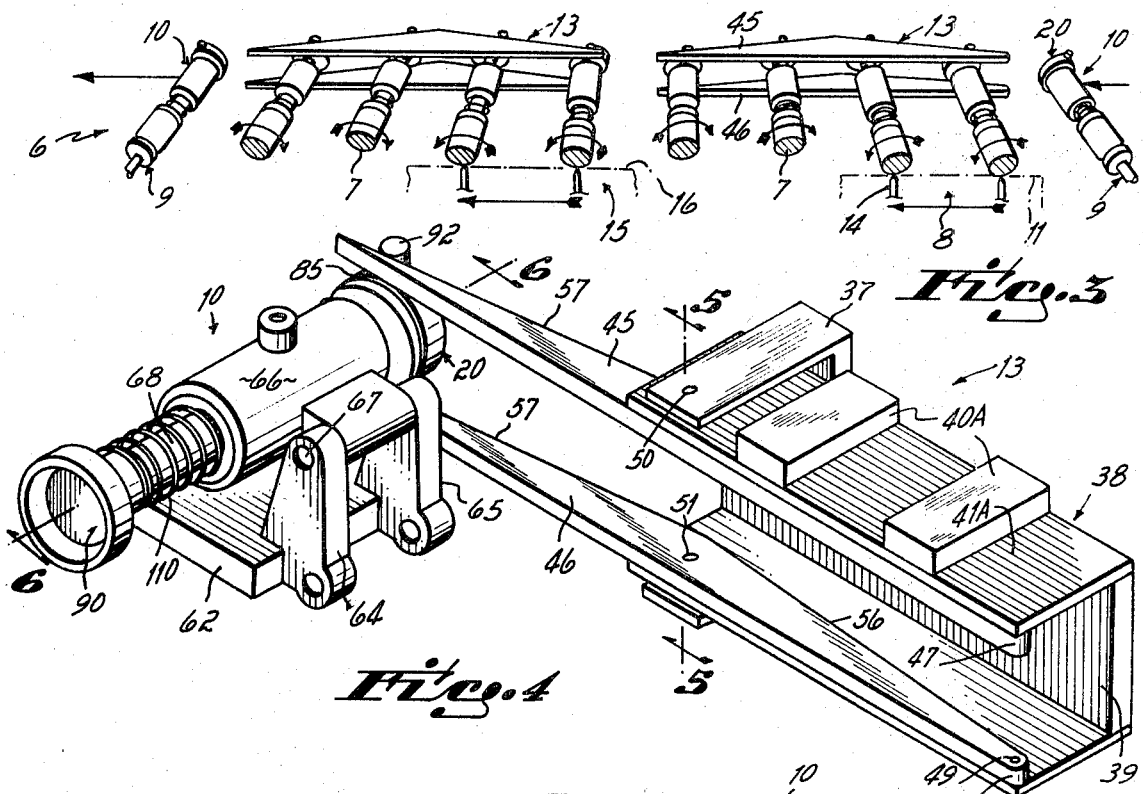
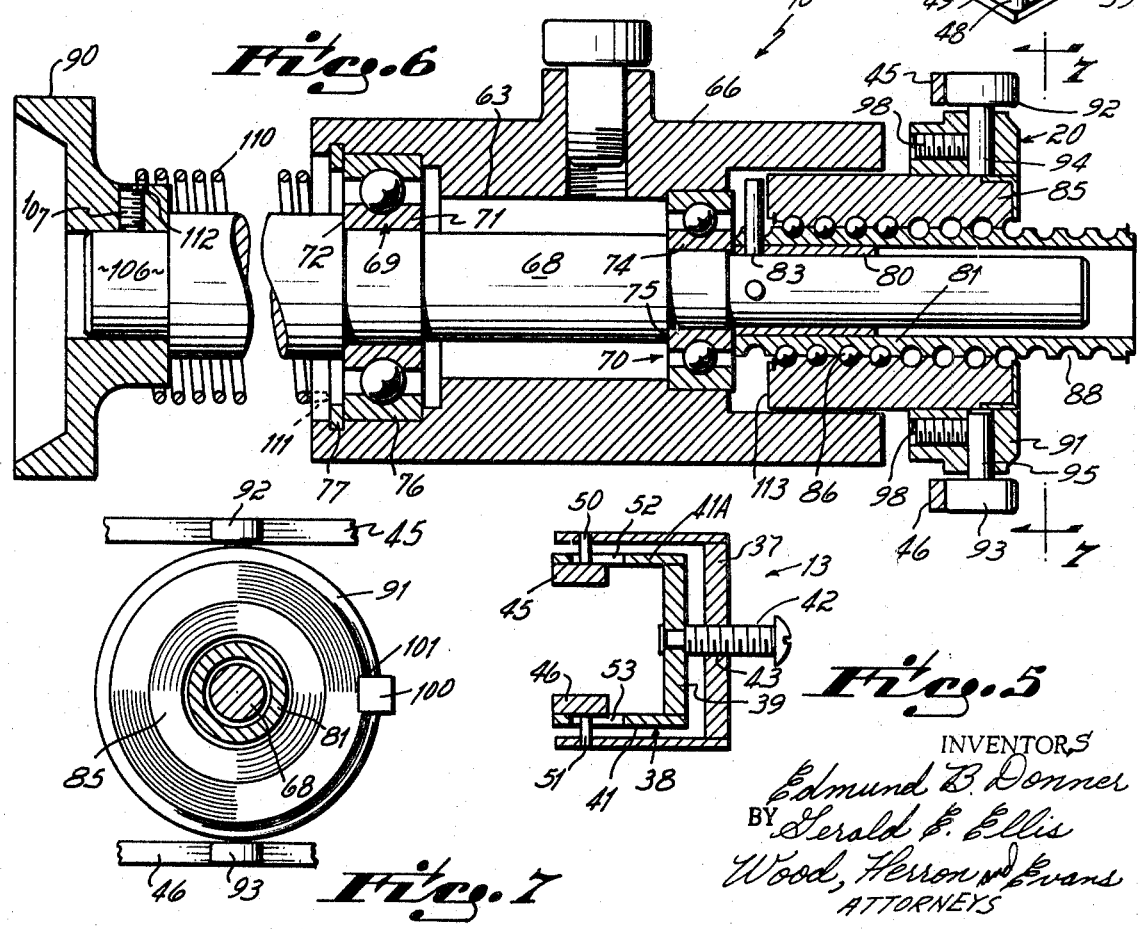

3,518,939
GLASS BOTTLE DECORATING MACHINE
Edmund B. Donner and Gerald E. Ellis, Washington, Pa., assignors to Solar Engineering and Equipment Company, Beaver, Pa., a corporation of Pennsylvania
Continuation-in-part of application Ser. No. 660,799, Aug. 15, 1967. This application May 23, 1968, Ser. No. 731,459
Int. Cl. B41f 17/18
U.S. Cl. 101—40   12 Claims

ABSTRACT OF THE DISCLOSURE

Apparatus for decorating cylindrical bottles by forcing a decorative medium upwardly through a stationary pervious membrane onto continuously moving bottles passing over the top of the membrane. The apparatus includes an indexing and rotating mechanism for effecting controlled rotation of the bottles as they move over the top of the membrane. This indexing and drive mechanism comprises a cam actuated non-rotatable nut movable axially over a screw connected to a rotatable portion of a bottle chuck.

---

This application is a continuation-in-part of U.S. patent application Ser. No. 660,799, filed Aug. 15, 1967 for Method and Apparatus for Decorating Ware.

This invention relates to glass bottle decorating machines and particularly to a positive drive system for effecting indexing and rotation of glass bottles as they are moved over decorating stencils of a decorating machine.

In our earlier filed co-pending U.S. patent application Ser. No. 660,799, filed Aug. 15, 1967, for "Method and Apparatus for Decorating Ware" there is disclosed a glass bottle decorating machine which comprises a conveyor for transporting a row of continuously moving bottles along a horizontal path of travel past a series of stenciling stations. The bottles are transported on the conveyor by rotatable chucks so that they are free for rotation about the longiudinal axes of the bottles. During movement along the conveyor, the bottles are periodically indexed to locate a particular portion of each bottle over a screen or membrane. After having been indexed, the bottles are lowered onto the screen over which they are then frictionally rotated while a pattern of decorative material is forced upwardly through the screen and onto the bottles. After the pattern from one screen has been applied to the bottles, they are lifted out of engagement with the first screen and moved forwardly over the next screen where the process is repeated until several different patterns or colors have been applied to the bottles.

We have now determined that when the machine disclosed in that application is utilized in a commercial glass bottle manufacturing plant, it is difficult for an unskilled machine operator to maintain the setup of the machine so that the indexing of the bottles is controlled with sufficient accuracy to insure proper application of the decorative patterns to the bottles. Specifically, we have found that unskilled machine operators are unwilling to pay sufficient attention to a decorating machine to insure that the machine remains properly adjusted so that each color of a multicolored pattern is properly located on the bottles. Too often, the machine gets out of adjustment and, because of inattention of the operator, the machine runs cullet or scrap for a long period of time. Accordingly, it has been a primary objective of this invention to provide a machine which, once properly set up, will remain adjusted and will thereafter be foolproof so that it requires a very minimum of attention to produce acceptable products even in the absence of the operator's attention of presence.

The machine described in the above identified application and upon whch this invention is an improvement, relies upon frictional engagement of the bottles with the stencil to effect rolling of the bottles over the stencil. This frictional rolling engagement of the bottles with the stencil requires proper adjustment of the machine and thus attention of the machine operator to the adjustment.

This invention eliminates reliance upon frictional rolling contact between the bottles and the stencil to effect the rotational movement of the bottles. Consequently, it eliminates the necessity for the machine operator to attend to the adjustment of the frictional rolling contact between the bottles and the stencils. Specifically, this invention provides a positive drive for rotating the bottles at a predetermined rate and for initiating rolling contact of the bottles at a predetermined point in the bottles' path of travel so as to effect accurate location of the decorative patterns on the bottles.

Very briefly, the indexing control of this invention comprises a ball-threaded nut secured to a shaft of each of the bottle chucks. Cams located at each of the stencil decorating stations effect axial displacement of the nuts on the shaft so as to rotate the shafts and the chucks as the bottles move through a decorating station. Thus the bottles are positively driven in rotation as they pass through the stenciling stations.

One advantage of this positive drive bottle chuck is that it may be easily added to an existing machine without materially changing the design of the machine. Additionally, it eliminates the necessity for the machine operator to attend to the adjustment of the frictional rolling contact of the bottles with the stencils of the machines and thus it enables the machine to operate properly in the absence of an attentive machine operator.

These and other objects and advantages of this invention will be more readily apparent from the following description of the drawings in which:

FIG. 1 is a diagrammatic illustration of the sequence of operations followed by a row of bottles in passing through a decorating machine to which the invention of this application is applied.

FIG. 2 is a transverse cross sectional view, partially broken away, of the decorating machine to which the bottle chuck conveyor of this invention is attached.

FIG. 3 is a more detailed diagrammatic illustration of a portion of the machine illustrated in FIG. 1, FIG. 4 is a perspective view of the bottle chuck rotating mechanism of the machine.

FIG. 5 is a cross sectional view through the control cam assembly taken on line 5—5 of FIG. 4, FIG. 6 is a cross sectional view through the bottle chuck taken on Line 6—6 of FIG. 4, and FIG. 7 is a cross sectional view of the rear of the bottle chuck taken on line 7—7 of FIG. 6.

The improved bottle indexing and rotating mechanism of this invention is illustrated as applied to the bottle decorating machine which is the subject matter of our copending application No. 660,799 entitled "Method and Apparatus for Decorating Ware," filed Aug. 15, 1967. For purposes of clarity and minimizing unnecessary disclosure in this application, the machine described in that application has not been completely illustrated and described herein. However, the disclosure of that application is hereby incorporated by reference.

The machine upon which this invention is an improvement is functionally illustrated in FIG. 1. The flow diagram of that figure illustrates the movement of bottles or ware through the machine and the sequential steps employed therein to decorate ware. As may be seen in FIG. 1, bottles enter the machine from the right-hand side of the diagram through a letdown station 5 at which bottles are moved from a vertical or upstanding position into a letdown or horizontal position. This letdown mechanism deposits the bottles on an infeed conveyor (not shown) which subsequently moves the bottles to the left as viewed in FIG. 1 to a position in which the bottles are picked up by the main chucking conveyor 6 of the machine. In this main conveyor 6 of the machine, each bottle 7 is chucked and supported for rotation about the horizontal axis of the bottle.

When the bottles arrive at the first stenciling station 8 they are supported in the chucks 9, 10 of the main chucking conveyor. As a bottle arrives over the first stenciling station 8, it is moved vertically downwardly into contact with the top of the stenciling screen or membrane 11 of the first stenciling station 8. This membrane 11 is located over the top surface of a paint box 12 and has a portion previous to a decorative medium or coloring agent in the paint box and another portion impervious to the same decorative medium.

While the bottle is in contact with the membrane 11, it is rotated by the indexing and rotational control mechanism 13 of this invention as it is transported forwardly on the main chucking conveyor 6. While the bottle 7 is rolled over the screen 11, the decorative medium is forced upwardly through the screen by a continuously moving squeegee 14 so that a pattern of decorative material is deposited on the bottle. As is explained in detail in our co-pending application, the squeegee 14 is secured to an endless chain conveyor movable along a path of travel which is located in a vertical plane. While the squeegee moves beneath the bottle and is engaged with the stencil 11, a paint platform or elevator (not shown) in front of the squeegee is raised toward the stenciling screen. In passing around the trailing end of the squeegee conveyor the paint elevator picks up a deposit of paint so that when subsequently moved along in front of a squeegee on the upper run of the conveyor, the raising of the elevator maintains the decreasing paint deposit on the elevator in contact with the lower side of the stencil.

In rolling over the screen 11 on the top of a paint box 12 at a stenciling station, each bottle rolls through an arc of approximately 360°. The coloring agent or decorative material is a commercially available fast-setting organic or inorganic coloring material which sets sufficiently quickly that subsequent contact of the decorative medium with a subsequent stenciling screen, or with the same screen if the bottle is rolled through more than 360°, does not smear the pattern previously deposited.

After a bottle has rolled through approximately one revolution at the first stenciling station 8, it is lifted off of the membrane 11. As explained more fully hereinafter, a torsion spring of the bottle chuck 10 then rotates the chuck and the bottle in a reverse direction one full revolution back to a zero or reset position. The bottle is then moved forwardly by the main chucking conveyor 6 to a second stenciling station 15 at which the bottle 7 is again dropped or lowered into contact with the stenciling screen 16 of this stenciling station 15. While engaged with the screen 16, the bottle continues to move forwardly while simultaneously being rotated as a consequence of engagement of the bottle rotating mechanism with another control mechanism 13. As the bottle rolls over the membrane 16, a second decorative pattern is deposited on the bottle. In most applications, the second pattern is a foreground pattern which is deposited directly on the top of a different colored background pattern, the background pattern having been placed on the bottle at the first stenciling station.

After having rotated over the membrane 16 at the second stenciling station 15, the bottle 7 is lifted vertically out of contact with the membrane while its movement is continued forwardly on the main chucking conveyor 6. As the bottle 7 moves forwardly on the conveyor it is raised to be out of contact with the screen and is rotated in a reverse direction back to zero or reset index position. The bottle is then continued forwardly on the main chucking conveyor 6 to a third stenciling station 17 where the bottle 7 is again dropped or lowered into contact with the top surface of a third stenciling screen 18. While engaged with the screen 18, the bottle 7 is rotated while a coloring material is forced upwardly through the pervious portion of the screen onto the surface of the bottle. After having rotated through approximately 360° on the top of the third membrane 18, the bottle is lifted out of engagement with the membrane 18 and is transferred forwardly to an output conveyor (not shown).

The main chucking conveyor 6 then deposits the decorated bottles onto the output conveyor which moves the bottles forwardly to a pickup station 19. At the pickup station 19, the bottles are moved from the horizontal plane into a vertical plane from whence they are conveyed out of or away from the decorating machine to a drying kiln or oven.

The apparatus which effects all of the bottle decorating sequence of operations outlined hereinabove, except for the mechanism for indexing and rotating the bottles over the stencils, is the subject matter of our pending application Ser. No. 660,799. It therefore has not been described in detail herein but that subject matter is incorporated by reference for purposes of completing this disclosure.

The mechanism which effects rotation and indexing of the bottles on the main chucking conveyor comprises a series of adjustable control mechanisms or cam assemblies 13 and cooperable chuck rotating mechanism 20 mounted within each of the bottle chucks 10. Since all of these chuck assemblies 10 and all of the actuating cam assemblies 13 are identical, only one bottle chuck 10 and one actuating cam assembly 13 will be described in detail herein.

ADJUSTABLE CAM ASSEMBLY

Referring first to FIGS. 4 and 5, it will be seen that each cam assembly 13 includes a generally U-shaped supporting bracket 37 adjustably mounted upon a generally U-shaped frame 38. A screw 42 is threaded through a threaded aperture 43 of the bracket 37 and is rotatably journaled at its forward end in a vertical wall 39 of the frame 38 so that rotation of the screw effects forward and rearward movement of the bracket 37. To fixedly mount the cam supporting frame 38 on the frame of the decorating machine, mounting blocks 40 (FIG. 2) are welded or otherwise secured to the underside of the lower leg 41 of the frame 38. Similar mounting blocks 40A are affixed to the upper leg 41A to provide structural support for the guide of the chuck conveyor 6.

Two generally triangularly shaped cams 45, 46 control rotation of the bottle chucks 10. These cams 45, 46 are pivotally mounted at their downstream ends 47, 48 upon pivot pins 49 which extend into and are fixedly mounted in the upper and lower legs 41 and 41A of the frame 38. Adjacent the apex of the cams, each 45, 46 is welded or otherwise fixedly secured to a vertical pin 50, 51, which extends through a slot 52, 53 of the legs 41 and 41A of the cam supporting frame 38. The ends of the pins 50, 51 opposite the cam mounted ends are fixedly secured to forwardly extending legs of the U-shaped bracket 37 so that movement of the bracket 37 relative to the frame 38 effects movement of the pins 50, 51 and thus of the attached cams 45, 46 respectively. This movement results in pivoting movement of the cams 45, 46 about the pivot pins 49. As explained more fully hereinafter, this adjustment of the cams varies the slope of the cam surfaces 56 so as to vary the rate of rotation of the chucks as they progress downstream over the cams.

BOTTLE SUPPORTING CHUCK

The chucks 9 which support the mouths of the bottles are identical to the bottle mouth supporting chucks disclosed in application Ser. No. 660,799 and accordingly have not been described in detail herein. The bottle base supporting chucks 10 differ from the base supporting chucks of the above identified application. They are, however, supported upon base plates 62 which are identical to the base plates of the above identified application.

From each of the base plates 62, a pair of vertical legs 64, 65 extend upwardly and pivotally support a body 66 of a chuck. The pivotal mounting 67 of the body 66 to the base plate 62 enables the chucks to be moved upwardly and downwardly by a cam 23 (FIG. 2) into and out of contact with the stenciling membranes at the decorating stations as explained more fully hereinafter.

Each chuck body 66 has a central aperture 63 extending axially therethrough. A bottle chucking shaft 68 extends axially through this aperture 63 and is rotatably journaled therein upon a pair of ball bearings 69 and 70. The inner race 71 of the ball bearing 69 is held in place on the shaft 68 by abutment with a shoulder 72 of a stepped section of the shaft. Similarly, the inner race 74 of the bearing 70 is held against a shoulder 75 of the shaft 68 by a collar 80 on the shaft 68. A split ring 77 is mounted within an annular groove of the body and secures the outer race 76 of the bearing 69 against axial movement on the shaft 68. A stop pin 83 extends radially from the shaft 68 through aligned apertures in the collar 80 and an inner sleeve 81 secured to the rear of the shaft 68.

Rotational movement of the sleeve 81 and the connecting shaft 68 is controlled by axial displacement of a ball threaded nut 85 mounted over and cooperable with a ball screw machined onto the outer periphery of the sleeve 81. Ball bearings 86 are located within a circular cross section helical groove defined by helical recesses 88 on the outside surface of the inner sleeve 81 and the inside of the nut 85. These ball bearings 86 enable the nut 85 to be moved axially on the shaft without rotation and to thereby effect rotational movement of the inner sleeve 81. Since the inner sleeve 81 is keyed to the shaft 68 by the stop pin 83, this longitudinal displacement of the nut 85 results in rotational displacement of the shaft 68 and the attached bottle chuck 90 on the forward end 106 of the shaft 68.

Longitudinal displacement of the nut 85 is effected by the engagement of rollers 92, 93 affixed to the sleeve with the cam surfaces 56, 57 of the cams 45, 46. These rollers 92, 93 are rotatably journaled upon radial pins 94, 95 which are fixedly secured within a sleeve 91 by setscrews 98. The sleeve 91 is in turn fixedly secured over the nut 85.

To restrain or hold the nut 85 against rotation, a key 100 extends longitudinally of the body 66 and is secured to the body by setscrews (not shown). This key 100 extends into and is slidable relative to a channel 101 on the outer peripheral surface of the sleeve 91.

The bottle face chuck plate 90 is generally cup-shaped and has a rearwardly extending annular hub mounted over the small diameter forward end section 106 of the shaft 68. The hub is secured to the shaft by a setscrew 107 and has a tapered recess in its front face for reception of the bottoms of bottles.

To angularly position the shaft 68 and the attached chuck 90 at a predetermined angular position prior to engagement of the rollers 92, 93 with one of the cams 45, 46, and to return the shaft and chuck to this angular position, or zero reset position, after each rotational movement across a stencil, a torsion spring 110 is mounted over the shaft 68 between the forward end of the body 66 and the rear end of the chuck 90. One end of this torsion spring is mounted within a recess 111 in the body 66 and the other end is supported within a recess 112 in the chuck 90. This torsion spring 110 is pre-stressed so that it always biases the shaft 68 to a rotational position in which the end face 113 of the nut 85 is engaged with the radial stop abutment 83 on the shaft.

OPERATION

In operation, the torsion spring 110 biases the shaft 68 to a reset position in which the end face 113 of the ball threaded nut 85 is engaged with the stop abutment 83. This is the position of the shaft 68 and chuck face plate 113 when the chucks 9, 10 pick up a bottle 7 from the infeed conveyor (not shown) of the machine and until the rollers 92, 93 are forced rearwardly to effect rotation of the inner sleeve 81 of the nut. Since the sleeve 81 is keyed to the shaft 68, rotation of the sleeve effects rotation of the shaft 68 and thus of the chuck 90.

The rate at which the shaft 68 and chuck 90 are rotated is controlled by the adjusted position of the cams 45, 46 as determined by the setting of the screw 42. Assuming that the lead on the helical groove 88 is .7500 inch, the cams 45, 46 can be set so that the rollers 92, 93 are moved rearwardly .7500 inch in a longitudinal distance equal to the circumference of the bottle being decorated. In other words, if the bottle is 7½ inches in circumference, then the cams 45, 46 are adjusted so that they effect rearward movement of the rollers 92, 93 .7500 inch in 7½ inches of longitudinal travel of the chuck. Thus the chucks rotate 360° or one revolution in 7½ inches of longitudinal travel. This adjustment would, of course, be varied in accordance with the diameter of the bottles being decorated in the machine.

The cams which effect lowering of the bottles onto the screens or membranes of the paint boxes are adjusted so that the bottle is lowered by the chucks into contact with the screen simultaneously with initiation of the rotation of the chucks 9, 10, and the bottle mounted therebetween. After the bottle has rotated through 360°, it is lifted by the cams 23, 24 out of engagement with the screen. As soon as the bottle is out of engagement with the stenciling screen, the cam followers 92, 93 ride over the forwardly tapered cam surface 57 of the cams 45, 46 and the torsion spring 110 returns the nut 85 to its zero reset position in which the front face 113 of the nut 85 is engaged with the stop abutment 83.

This procedure is repeated at each of the decorating stations until the bottle has been completely decorated. It is then moved out of the machine on the output conveyor (not shown) and transported to the usual kiln or drying oven.

Having described in detail one preferred embodiment of our invention for purposes of complying with Title 35 United States Code Section 112 but not for purposes of limiting our invention, we claim:

1. Apparatus for decorating generally cylindrical ware which comprises:
   a stationary screen membrane which has a portion pervious to a decorative medium and another portion impervious to the same decorative medium,
   a transport conveyor for transporting said ware over said screen membrane,
   driving means for positively rotating said ware relative to said membrane as said ware is moved over said membrane by said conveyor,
   squeegee conveyor means movable in an endless path of travel beneath said membrane, said path of travel being located in a single vertical plane, said squeegee conveyor means being operative to force decorative medium upwardly through the screen membrane from beneath the membrane as the ware rotates over the top of the membrane so that a pattern of said decorative medium is transferred to said ware, and
   said driving means for rotating said ware including an actuating cam engageable and cooperable with said transport conveyor to effect rotation of said ware.

2. The apparatus of claim 1 in which said transport conveyor is a continuously moving, endless conveyor and in which said actuating cam is fixedly and adjustably mounted adjacent said conveyor.

3. Apparatus for decorating generally cylindrical ware which comprises:
   a plurality of stationary screen membranes, each of said membrane having one portion pervious to a decorative medium and another portion impervious to the same decorative medium, a continuously moving conveyor for transporting ware over each of said screen membranes, driving means for positively angularly indexing and driving said ware in rotation relative to each of said membranes as said ware is moved over each of said membranes by said conveyor, squeegee conveyor means movable in an endless path of travel beneath each of said membranes, said path of travel being located in a single vertical plane, said squeegee conveyor means being operative to continuously move at least one squeegee having decorative medium thereon beneath each of said screen membranes in synchronization with movement of ware over the top of the membranes so that a pattern of said decorative medium is transferred to each of said items of ware as it is rotated over said membranes, and said driving means for rotating said indexed ware including an actuating cam engageable and cooperative with said transport conveyor to effect rotation of said ware.

4. Apparatus for decorating generally cylindrical ware which comprises:

a plurality of stationary screen membranes, each of said membranes having one portion pervious to a decorative medium and another portion impervious to the same decorative medium, a conveyor for transporting and angularly indexing ware over each of said screen membranes, said conveyor comprising a plurality of pairs of rotatable chucks operable to support ware on said conveyor for rotation relative to said membranes, squeegee conveyor means movable in an endless path of travel beneath each of said membranes, said path of travel being located in a single vertical plane, said squeegee conveyor means being operative to continuously move at least one squeegee having decorative medium thereon beneath each of said screen membranes in synchronization with movement of ware over the top of the membrane so that a pattern of said decorative medium is transferred to each of said items of ware as it rotates over said membranes, and the improvement wherein one of each of said pairs of rotatable chucks includes a supporting shaft, a nut threaded over said shaft, and means for effecting axial displacement of said nut on said shaft so as to drive said shaft and said one chuck in rotation.

5. The apparatus of claim 4 wherein said one chuck includes a spring for biasing said nut into engagement with a stop so as to maintain said chuck in a preset angular position.

6. Apparatus for decorating generally cylindrical ware which comprises:

a plurality of stationary screen membranes, each of said membranes having one portion pervious to a decorative medium and another portion impervious to the same decorative medium, a conveyor for transporting ware over each of said screen membranes, said conveyor comprising a plurality of pairs of rotatable chucks operable to support ware on said conveyor for rotation relative to said membranes, means for moving at least one squeegee having decorative medium thereon beneath each of said screen membranes in synchronization with movement of ware over the top of the membranes so that a pattern of said decorative medium is transferred to each of said items of ware as it rotates over said membranes, the improvement wherein one of each of said pairs of rotatable chucks includes a supporting shaft, a nut threaded over said shaft, and means for effecting axial displacement of said nut on said shaft so as to drive said shaft and said one chuck in rotation, and said means for effecting axial displacement of said nut on said shaft comprising a cam located in the path of movement of said nut.

7. The apparatus of claim 6 wherein said cam is adjustably mounted so as to enable the rate at which said nut is moved axially on said shaft to be varied so as to vary the rate of rotation of said shaft and said one chuck.

8. Apparatus for decorating generally cylindrical ware which comprises:

a plurality of stationary screen membranes, each of said membranes having one portion pervious to a decorative medium and another portion impervious to the same decorative medium, a conveyor for transporting ware over each of said screen membranes, said conveyor comprising a plurality of pairs of rotatable chucks operable to support ware on said conveyor for rotation relative to said membrane, means for moving at least one squeegee having decorative medium thereon beneath each of said screen membranes in synchronization with movement of ware over the top of the membranes so that a pattern of said decorative medium is transferred to each of said items of ware as it rotates over said membranes, and the improvement wherein one of each of said pairs of rotatable chucks comprises a body pivotally mounted upon a supporting plate of said conveyor, a supporting shaft rotatably mounted within said body, a ware supporting cup non-rotatably mounted upon one end of said shaft, a nut threaded over the opposite end of said shaft, and means for effecting axial displacement of said nut over said shaft so as to drive said shaft and said ware supporting cup in rotation.

9. The apparatus of claim 8 wherein said one chuck includes a spring mounted over said shaft for biasing said nut into engagement with a stop so as to fix the angular position of said shaft.

10. The apparatus of claim 9 wherein said spring is a torsion spring connected at one end to said shaft and at the other end to said body.

11. The apparatus of claim 8 wherein said nut is a ball threaded nut and wherein ball bearings are movable in a helical track between said nut and a sleeve nonrotatably secured to said shaft.

12. The apparatus of claim 8 wherein said means for effecting axial displacement of said nut over said shaft comprises a cam assembly having an assembly frame fixedly mounted upon apparatus and a cam track adjustably mounted upon said assembly frame.

References Cited

UNITED STATES PATENTS

| | | | |
|---|---|---|---|
| 1,861,610 | 6/1932 | Respess | 101—123 |
| 2,121,491 | 6/1938 | Soubier | 101—123 |
| 2,183,223 | 12/1939 | Mankin et al. | 101—124 |
| 2,739,531 | 3/1956 | Hagerman | 101—126 |
| 2,895,343 | 7/1959 | Orner | 74—424.8 XR |
| 3,062,070 | 11/1962 | Beatty et al. | 74—424.8 XR |
| 3,075,458 | 1/1963 | Parker. | |
| 3,161,073 | 12/1964 | Deutsch et al. | 74—424.8 |
| 3,251,298 | 5/1966 | Rudolph et al. | 101—40 |
| 3,253,538 | 7/1966 | Rudolph et al. | 101—40 |

FOREIGN PATENTS 591,691   4/1959   Italy.

ROBERT E. PULFREY, Primary Examiner

C. D. CROWDER, Assistant Examiner

U.S. Cl. X.R.

74—424.8; 101—115, 123